US011264001B1

(12) United States Patent
Maalouf

(10) Patent No.: US 11,264,001 B1
(45) Date of Patent: Mar. 1, 2022

(54) MUSICAL INSTRUMENT STAND SUPPORT APPARATUS WITH ROTATABLE ADJUSTMENT MECHANISM TO DISPLAY A GUITAR

(71) Applicant: Elie Maalouf, Burbank, CA (US)

(72) Inventor: Elie Maalouf, Burbank, CA (US)

( * ) Notice: Subject to any disclaimer, the term of this patent is extended or adjusted under 35 U.S.C. 154(b) by 245 days.

(21) Appl. No.: 16/739,331

(22) Filed: Jan. 10, 2020

(51) Int. Cl.
*G10G 5/00* (2006.01)
*F16M 11/10* (2006.01)

(52) U.S. Cl.
CPC ............... *G10G 5/00* (2013.01); *F16M 11/10* (2013.01)

(58) Field of Classification Search
CPC ................................. G10G 5/00; F16M 11/10
See application file for complete search history.

(56) References Cited

U.S. PATENT DOCUMENTS

| | | | | |
|---|---|---|---|---|
| 2,547,924 A * | 4/1951 | Citro | ............... | G10G 5/00 84/327 |
| 2,559,200 A * | 7/1951 | Schaf | ............... | G10G 5/00 84/267 |
| 4,037,815 A * | 7/1977 | DeLano | ............... | G10G 5/00 248/542 |
| 4,159,092 A * | 6/1979 | DeLano | ............... | F16M 11/041 248/276.1 |
| 4,742,751 A * | 5/1988 | Cherry | ............... | G10G 5/00 84/327 |
| 5,121,890 A * | 6/1992 | Komada | ............... | A47F 7/00 248/122.1 |
| 5,202,527 A * | 4/1993 | Gracie | ............... | F16M 11/28 84/327 |
| 8,235,344 B1 * | 8/2012 | Bergin | ............... | G10G 5/00 248/349.1 |
| 9,401,131 B2 * | 7/2016 | Canivell Grifols | ... | A47F 7/0028 |
| 11,004,433 B1 * | 5/2021 | VanHaight | ............... | G10D 1/08 |

* cited by examiner

*Primary Examiner* — Robert W Horn
(74) *Attorney, Agent, or Firm* — Plager Schack LLP; Mark H. Plager; Eric Liou

(57) ABSTRACT

A musical instrument stand support apparatus with enhanced stability and a rotatable adjustment mechanism designed to display a guitar in one of a plurality of viewing positions is provided. The stand support apparatus includes a support base, a securement frame rotatably mounted to the support base and having a plurality of bars and a support plate, an upper cradle coupled to the securement frame, and a pair of arms pivotably mounted to the securement frame. The stand support apparatus is designed to secure the guitar with its body disposed on the support plate, guitar neck disposed within the upper cradle and pair of sides of the guitar body secured within the pair of arms. The securement frame is rotatably adjusted relative to the support base to display the secured guitar in one of the plurality of viewing positions.

10 Claims, 3 Drawing Sheets

MUSICAL INSTRUMENT STAND SUPPORT APPARATUS WITH ROTATABLE ADJUSTMENT MECHANISM TO DISPLAY A GUITAR

BACKGROUND

The embodiments herein relate generally to musical instrument stands. More specifically, embodiments of the invention are directed to a musical instrument stand with a rotatable adjustment mechanism to display a guitar in a desired position.

Guitars and bass guitars are musical instruments commonly used by musicians to produce music in a wide variety of genres. Several music enthusiasts own vintage guitars or other collector's guitars, which can commonly range in value anywhere up to at least several hundreds of thousands of dollars per guitar. These guitars are typically displayed on a stand to improve the aesthetics of a room and to allow individuals to appreciate the beauty of the instrument from different angles. Due to the high value and/or rarity of these vintage guitars and other collector's guitars, there is a need for a sturdy stand that will prominently display these instruments without inadvertently dropping or damaging the instrument.

There exists a variety of guitar stands as disclosed in U.S. Pat. Nos. 5,202,527, 4,742,751 and 2,547,924, which comprise a combination of bar members and fasteners to secure a guitar in a stationary position. These guitar stands are limited for one or more of the following reasons: (1) the stand has limited stability and is not desirable for use with vintage or collector's guitars; and/or (2) the stand limits the range of motion of the secured guitar, and thus may not display the guitar in the user's preferred position.

As such, there is a need in the industry for a musical instrument support stand apparatus with enhanced stability that addresses the limitations of the prior art, which provides a greater range of motion of the secured guitar. This provides the user greater flexibility in displaying the guitar in the desired position.

SUMMARY

In certain embodiments of the invention, a musical instrument stand support apparatus with enhanced stability and a rotatable adjustment mechanism configured to display a guitar in one of a plurality of viewing positions is provided. The guitar comprises a neck coupled to a body having a top, a bottom and a pair of sides. The stand support apparatus comprises a support base, a securement frame rotatably mounted to the support base and comprising a plurality of bars connected together and a support plate coupled to one of the plurality of bars, an upper cradle coupled to the securement frame and configured to receive the neck of the guitar, and a pair of arms pivotably mounted to the securement frame, each arm in the pair of arms configured to pivotably adjust to one of a plurality of locking positions to contact the body of the guitar, wherein the stand support apparatus is configured to secure the guitar with the body disposed on the support plate, the neck disposed within the upper cradle and the pair of sides of the body secured within the pair of arms, wherein the securement frame is rotatably adjusted relative to the support base to display the secured guitar in one of the plurality of viewing positions.

In one embodiment, the stand support apparatus comprises a lower cradle coupled to the securement frame and configured to support the bottom of the body of the guitar

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
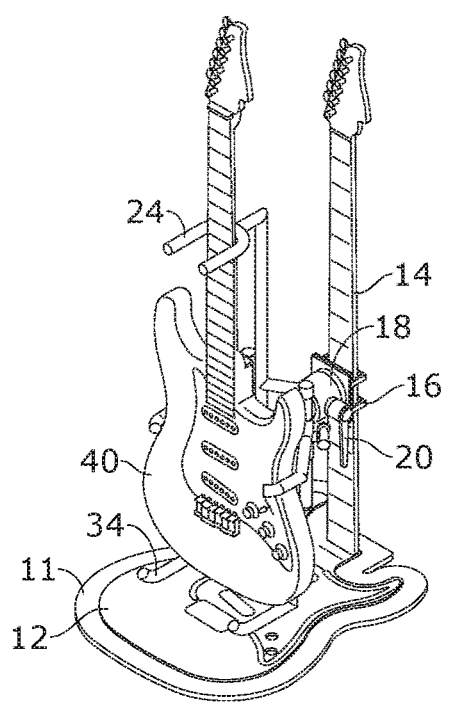
FIG. 1 depicts a perspective view of certain embodiments of the musical instrument stand support apparatus shown in use illustrating the guitar secured in an upright position.
Figure 2:
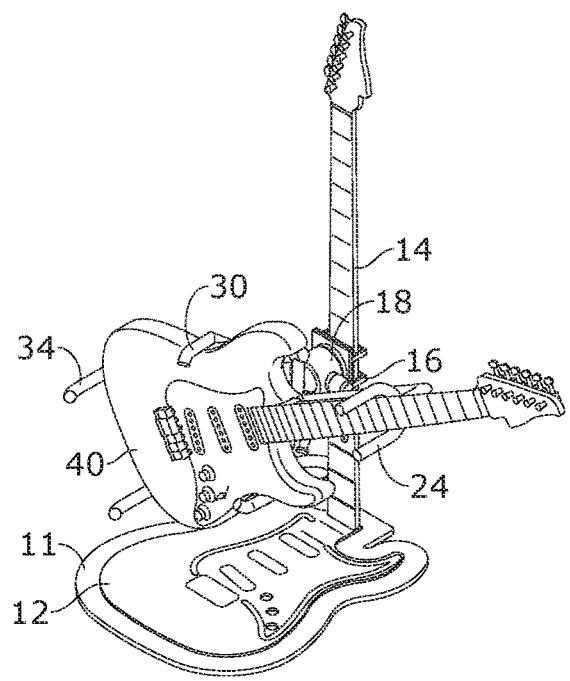
FIG. 2 depicts a perspective view of certain embodiments of the musical instrument stand support apparatus shown in use illustrating the guitar secured in an alternative position.
Figure 3:
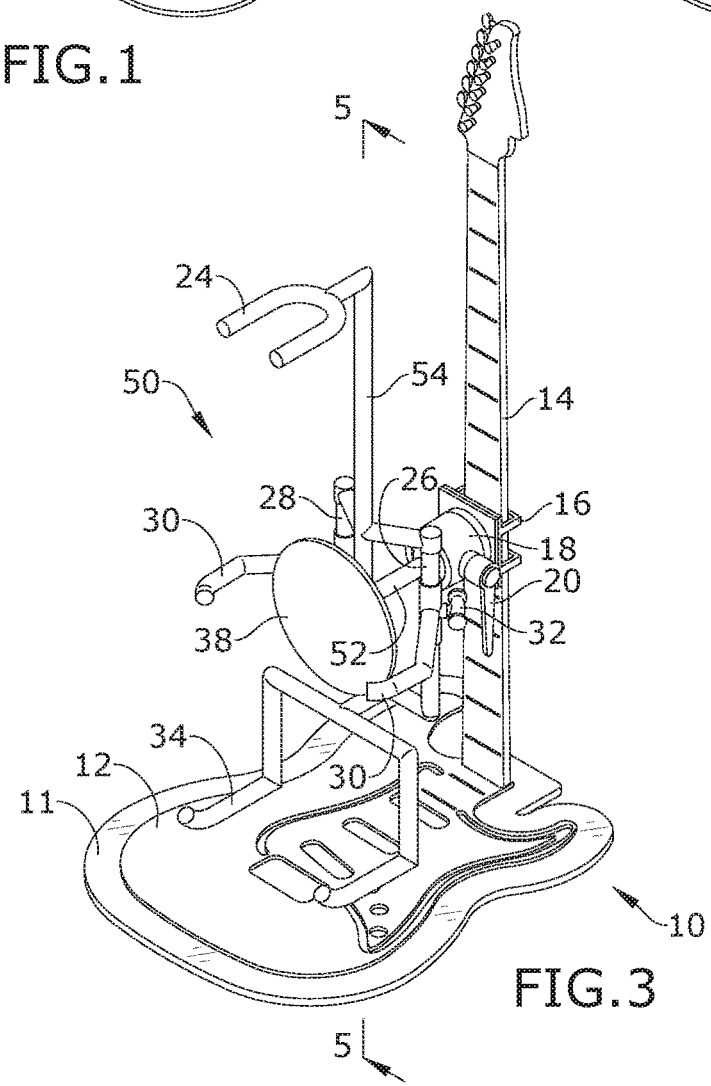
FIG. 3 depicts a perspective view of certain embodiments of the musical instrument stand support apparatus.

In certain embodiments of the invention as depicted in FIGS. 1-3, the musical instrument stand support apparatus comprises a stable platform that is configured to secure and display guitar 40 in one of a plurality of positions. Guitar 40 can be any type of guitar or base guitar known in the field having variable shapes and sizes. Although the figures depict the musical instrument stand support apparatus used with a guitar, it shall be appreciated that the apparatus can be used with any alternative musical instruments including, but not limited to, banjos, ukuleles, mandolins, fiddles or other instruments.

In one embodiment, the stand support apparatus generally comprises support base 10 and securement frame 50. The components of support base 10 and securement frame 50 are preferably made from 1018 cold-rolled steel, unless otherwise specified. In alternative embodiments, the components of support base 10 and securement frame 50 can be made from other types of steel, metals or materials.

Figure 7:
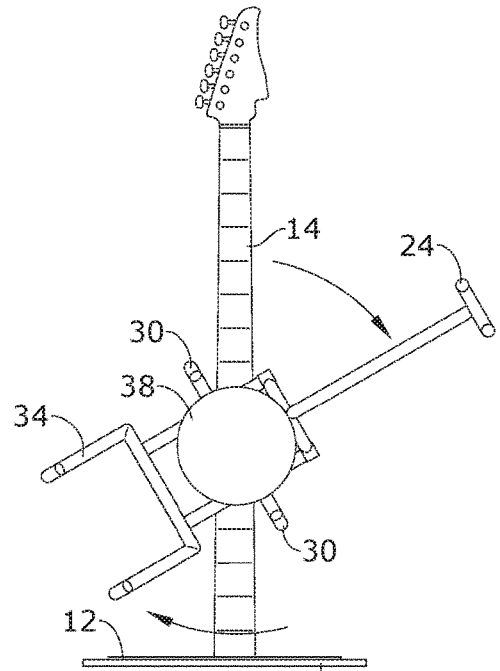
FIG. 7 depicts a front view of certain embodiments of the musical instrument stand support apparatus illustrating the rotation of securement frame 50.

As depicted in FIGS. 1-2 and 7, securement frame 50 is rotatably mounted to support base 10 and is configured to adjust to display guitar 40 in the plurality of viewing positions. Securement frame 50 is configured to rotate up to 360 degrees relative to support base 10.

Figure 4:
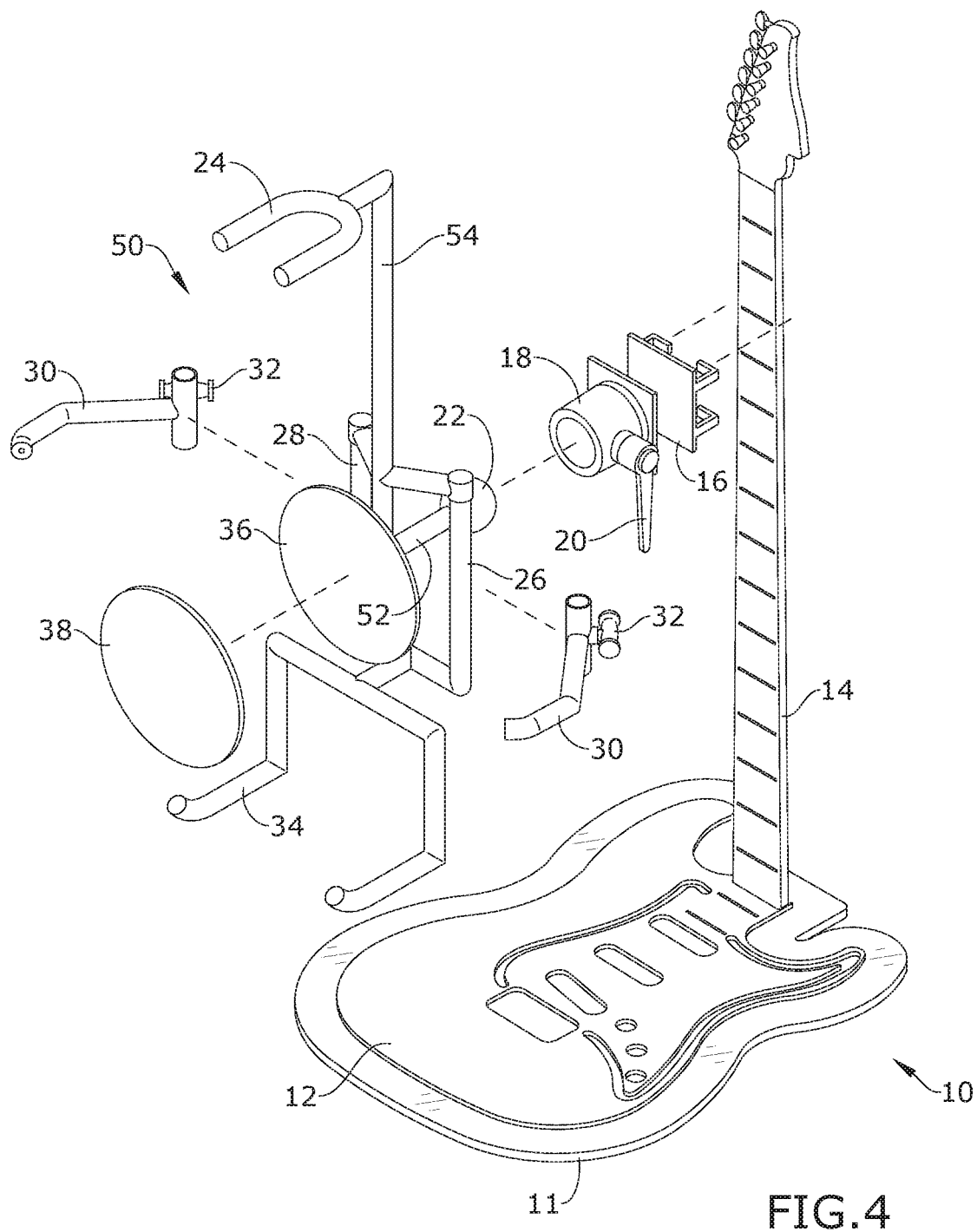
FIG. 4 depicts an exploded view of certain embodiments of the musical instrument stand support apparatus.

In one embodiment as depicted in FIGS. 3-4, support base 10 generally comprises acrylic base 11, base plate 12 and upright neck 14. Acrylic base 11 serves as the base platform of the stand support apparatus and is disposed on the ground. In one embodiment, one or more strings of LED lights or alternative illuminating devices are coupled to acrylic base 11 to enhance aesthetics of the stand support apparatus. In one embodiment, acrylic base 11 is made from Plexiglas. However, acrylic base 11 can be made from alternative materials and have various shapes, colors, markings, designs, logos and the like. In a preferred embodiment, acrylic base 11 comprises an outer shape that resembles a guitar body.

In one embodiment as depicted in FIGS. 3-4, base plate 12 of support base 10 is coupled to the top of acrylic base 11 by mechanical fasteners. In one embodiment, the bottom of base plate 12 comprises a plurality of bolts welded thereon that fastens base plate 12 to acrylic base 11. In an alternative embodiment, other fastening components can be used to secure base plate 12 to acrylic base 11. Base plate 12 can have variable shapes, colors, designs, markings, logos and the like. In a preferred embodiment, base plate 12 comprises a member having the size and shape of a guitar body.

In one embodiment as depicted in FIGS. 3-4, upright neck 14 comprises the shape and design of a guitar neck. Upright neck 14 comprises a first end that is welded or mechanically fastened to base plate 12. In a preferred embodiment, upright neck 14 extends vertically from base plate 12 and serves as a mounting location for securement frame 50. In one embodiment, additional reinforcement bars can be used to enhance the connection strength of upper neck 14 to base plate 12.

Figure 5:
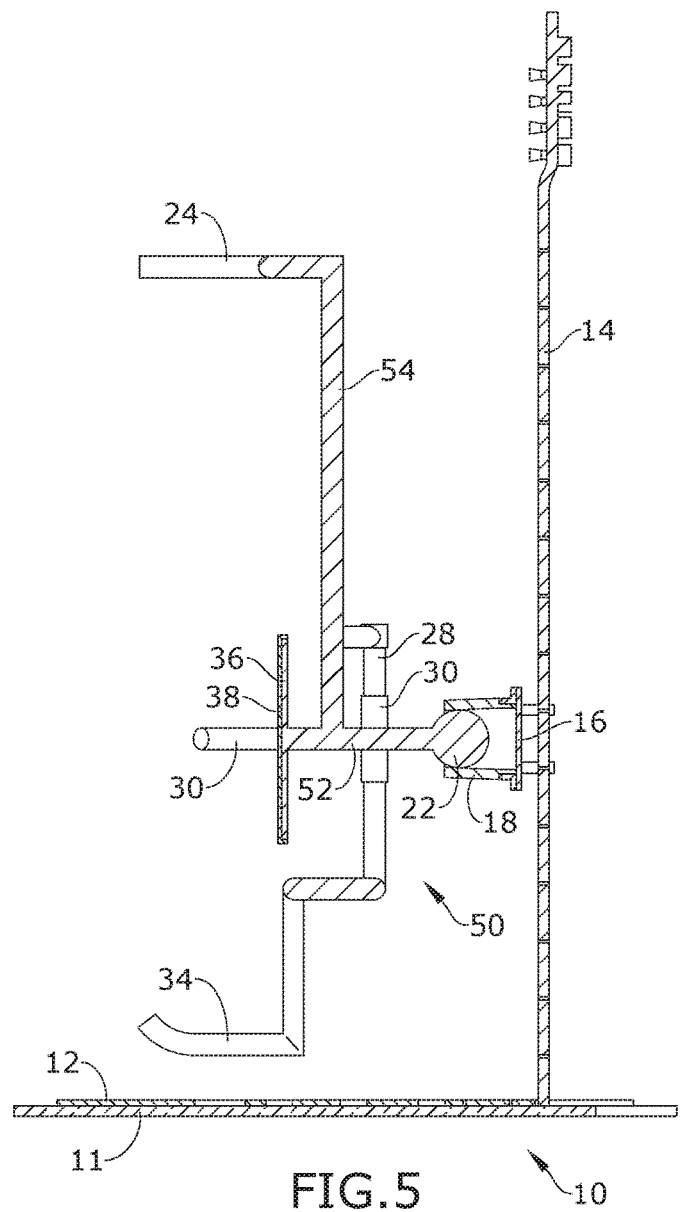
FIG. 5 depicts a section view of certain embodiments of the musical instrument stand support apparatus, taken along line 5-5 in FIG. 3.
Figure 6:
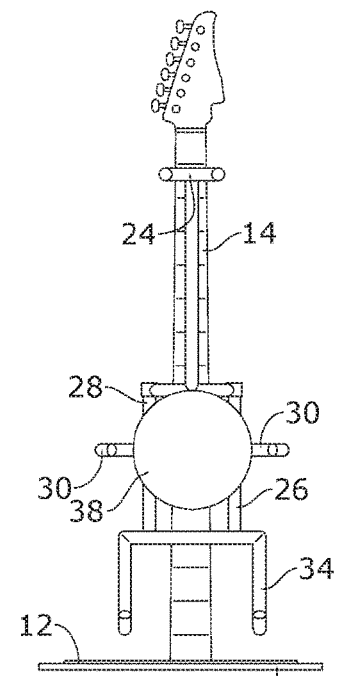
FIG. 6 depicts a front view of certain embodiments of the musical instrument stand support apparatus.

In certain embodiments as depicted in FIGS. 3-7, securement frame 50 is rotatably mounted to upright neck 14 of support base 10 by neck attachment 16 and swivel flange 18. Neck attachment 16 comprises a steel clamp member that is preferably welded to upright neck 14 of support base 10. In an alternative embodiment, mechanical fasteners or other fastening components can be used to couple neck attachment 16 to upright neck 14. In one embodiment as depicted in FIGS. 4-5, swivel flange 18 comprises a tubular member connected to a back plate. The back plate of swivel flange 18 is coupled to neck attachment 16 by four bolts.

In an alternative embodiment, any alternate number of bolts can be used to fasten swivel flange 18 to neck attachment 16. It shall be appreciated that other mechanical components or fastening components can also be used instead in alternative embodiments to fasten swivel flange 18 to neck attachment 16.

In certain embodiments as depicted in FIGS. 3-5, securement frame 50 comprises a plurality of bars connected together including at least horizontal bar 52, vertical bar 54, first side frame bar 26 and second side frame bar 28, upper cradle 24, a pair of side arms 30 and bottom cradle 34. It shall be appreciated that the components of securement frame 50 can be welded together or fastened together using any fastening components known in the field.

In a preferred embodiment, horizontal bar 52 is continuously connected to vertical bar 54. However, horizontal bar 52 and vertical bar 54 can be separate bars connected together in an alternative embodiment. In one embodiment, horizontal bar 52 comprises a first end having spherical member 22 and a second end having support plate 36. As depicted in FIGS. 4-5, spherical member 22 is disposed within the tubular member of swivel flange 18.

In one embodiment, lock handle 20 is operably connected to swivel flange 18 and is configured to communicate with spherical member 22 of horizontal bar 52. In certain embodiments, lock handle 20 is configured to maneuver to an unlocked position to disengage with spherical member 22, thereby enabling rotatable movement of spherical member 22 and securement frame 50 relative to swivel flange 18. Lock handle 20 is configured to maneuver to a locked position to engage with spherical member 22, thereby preventing rotatable movement of spherical member 22 and securement frame 50 relative to swivel flange 18.

In certain embodiments as depicted in FIGS. 1-2 and 4-5, upper cradle 24 is coupled to the top end of vertical bar 54 and is configured to receive the neck of guitar 40. In a preferred embodiment, upper cradle 24 comprises a U-shaped member with a pair of prongs that extends on opposing sides of the neck of guitar 40 as depicted in FIGS. 1-2. However, the shape of upper cradle 24 can vary in alternative embodiments.

In one embodiment as depicted in FIGS. 1-4, first and second side frame bars 26, 28 are coupled to vertical bar 54 by connecting members. Each side frame bar 26, 28 serves as a mounting location for one of the pair of side arms 30. Each side frame bar 26, 28 comprises an end tubular member that is disposed around first side frame bar 26 or second side frame bar 28. This connection allows first and second side arms 30 to pivot on first and second side frame bars 26, 28.

In one embodiment, set screw 32 is coupled to the tubular member connected to each side arm 30. Set screw 32 is configured to adjust to disengage from first side frame bar 26 or second side frame bar 28. This allows side arm 30 to pivot on side frame bar 26, 28. Alternatively, set screw 32 is configured to adjust to engage with first side frame bar 26 or second side frame bar 28. This locks side arm 30 in place, thereby preventing pivotal movement of side arm 30 on side frame bar 26, 28.

In one embodiment as depicted in FIGS. 1-5, lower cradle 34 is coupled to vertical bar 54 and comprises a pair of L-shaped members. The L-shaped members of lower cradle 34 are configured to contact and support the bottom of the body of guitar 40.

In one embodiment as depicted in FIG. 4, pad 38 is coupled to support plate 36 and comprises a material such as leather, rubber or other resilient and/or deformable material. In one embodiment, a padding material is disposed around upper cradle 24, the pair of side arms 30, bottom cradle 34, and any other location on the stand support apparatus that contacts guitar 40. The padding material comprises a material such as leather, rubber or other resilient and/or deformable material.

In operation, guitar 40 is secured to the stand support apparatus. In one embodiment as depicted in FIG. 1, guitar 40 is maneuvered so that the body is disposed against pad 38 and support plate 36, the bottom of the guitar body is disposed on lower cradle 34, and the neck of guitar 40 is disposed in upper cradle 24. The pair of side arms 30 are pivotably adjusted and locked in place to contact the sides of the body of guitar 40.

In this position, guitar 40 is securely fastened within upper cradle 24, side arms 30 and lower cradle 34 of securement frame 50 of the stand support apparatus. Lock handle 20 can be unlocked to permit securement frame 50 and guitar 40 to rotate up to 360 degrees relative to upright neck 14 of support base 10 as depicted in FIG. 7. Lock handle 20 is maneuvered to retain guitar 40 in the desired locking position. Since guitar 40 is securely fastened to securement frame 50, guitar 40 will not detach from the stand support apparatus in any displayed position.

In an alternative embodiment, it shall be appreciated that the pair of side arms 30 can be pivotably mounted to any other locations on securement frame 50. This allows side arms 30 to pivotably adjust to contact any alternative locations on the body of guitar 40. This is beneficial because it allows the stand support apparatus to accommodate different types of guitars and other musical instruments.

It shall be appreciated that the components of the stand support apparatus described in several embodiments herein may comprise any alternative known materials in the field and be of any color, size and/or dimensions. It shall be appreciated that the components of the stand support apparatus described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention, the scope of the invention is reflected by the breadth of the claims below rather than narrowed by the embodiments described above.

What is claimed is:

1. A musical instrument stand support apparatus with enhanced stability and a rotatable adjustment mechanism configured to display a guitar in one of a plurality of viewing positions, the guitar comprising a neck coupled to a body having a top, a bottom and a pair of sides, the stand support apparatus comprising:
   a support base;
   a securement frame rotatably mounted to the support base and comprising a plurality of bars connected together and a support plate coupled to one of the plurality of bars;
   an upper cradle coupled to the securement frame and configured to receive the neck of the guitar; and
   a pair of arms pivotably mounted to the securement frame, each arm in the pair of arms configured to pivotably adjust to one of a plurality of locking positions to contact the body of the guitar;
   wherein the stand support apparatus is configured to secure the guitar with the body disposed on the support plate, the neck disposed within the upper cradle and the pair of sides of the body secured within the pair of arms, wherein the securement frame is rotatably adjusted relative to the support base to display the secured guitar in one of the plurality of viewing positions.

2. The stand support apparatus of claim 1, further comprising a lower cradle coupled to the securement frame and configured to support the bottom of the body of the guitar.

3. The stand support apparatus of claim 2, wherein the support base comprises an upright neck coupled to a base plate.

4. The stand support apparatus of claim 3, wherein the plurality of bars of the securement frame comprises a horizontal bar continuously connected to a vertical bar, the horizontal bar comprising a first end coupled to the upright neck of the support base and a second end coupled to the support plate of the securement frame, the horizontal bar comprising the upper cradle coupled thereto.

5. The stand support apparatus of claim 4, wherein the first end of the horizontal bar in the securement frame comprises a spherical member rotatably mounted to a flange that is coupled to the upright neck of the support base.

6. The stand support apparatus of claim 5, further comprising a handle coupled to the flange and configured to adjust to an unlocked position to permit rotatable movement of the spherical member relative to the flange and a locked position to prevent movement of the spherical member relative to the flange.

7. The stand support apparatus of claim 6, wherein the plurality of bars of the securement frame comprises a pair of side frame bars coupled to the horizontal bar, the first arm in the pair of arms pivotably mounted to the first side frame bar in the pair of side frame bars and the second arm in the pair of arms pivotably mounted to the second side frame bar in the pair of side frame bars.

8. The stand support apparatus of claim 7, further comprising a pad coupled to the support plate of the securement frame and configured to directly contact the body of the guitar.

9. The stand support apparatus of claim 8, wherein the upper cradle comprises a U-shaped bar.

10. The stand support apparatus of claim 9, wherein the lower cradle comprises a pair of L-shaped members coupled to the securement frame.

\* \* \* \* \*